(12) United States Patent
McMurtry et al.

(10) Patent No.: US 7,127,825 B2
(45) Date of Patent: Oct. 31, 2006

(54) STYLUS ORIENTATION

(75) Inventors: David Roberts McMurtry, Dursley (GB); Geoff McFarland, Dursley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/477,892

(22) PCT Filed: Jun. 13, 2002

(86) PCT No.: PCT/GB02/02460

§ 371 (c)(1),
(2), (4) Date: Nov. 19, 2003

(87) PCT Pub. No.: WO02/101329

PCT Pub. Date: Dec. 19, 2002

(65) Prior Publication Data

US 2004/0163268 A1      Aug. 26, 2004

(30) Foreign Application Priority Data

Jun. 13, 2001   (GB) .................................. 0114360.1

(51) Int. Cl.
    *G01B 5/20* (2006.01)
(52) U.S. Cl. .................... 33/556; 33/503; 33/DIG. 1
(58) Field of Classification Search .......... 33/502–503, 33/556, 558.01, 559, DIG. 1, 549
See application file for complete search history.

(56) References Cited

U.S. PATENT DOCUMENTS

| 4,168,576 | A |   | 9/1979  | McMurtry |
|-----------|---|---|---------|----------|
| 4,523,450 | A | * | 6/1985  | Herzog .......................... 33/503 |
| 4,649,623 | A | * | 3/1987  | Schneider et al. ............ 33/561 |
| 4,964,218 | A |   | 10/1990 | Morghen |
| 5,005,297 | A | * | 4/1991  | Aehnelt et al. ............... 33/559 |
| 5,041,806 | A | * | 8/1991  | Enderle et al. ............... 33/561 |
| 5,103,572 | A | * | 4/1992  | Ricklefs ....................... 33/558 |
| 5,121,551 | A | * | 6/1992  | Linder et al. ................. 33/556 |
| 5,259,120 | A | * | 11/1993 | Chapman et al. ............. 33/503 |
| 5,327,657 | A | * | 7/1994  | Hajdukiewicz et al. ....... 33/503 |
| 5,435,072 | A | * | 7/1995  | Lloyd et al. .................. 33/559 |
| 5,778,552 | A | * | 7/1998  | LeGuin ........................ 33/559 |
| 5,841,668 | A | * | 11/1998 | Pahk et al. ................... 33/503 |
| 5,848,477 | A |   | 12/1998 | Wiedmann et al. |
| 5,918,378 | A | * | 7/1999  | McMurtry et al. ............ 33/556 |
| 6,249,985 | B1| * | 6/2001  | Piko et al. .................... 33/503 |
| 6,772,527 | B1| * | 8/2004  | Butter et al. .................. 33/503 |

FOREIGN PATENT DOCUMENTS

EP       0 389 108 A2    9/1990
GB       2 306 005 A     4/1997

\* cited by examiner

*Primary Examiner*—Yaritza Guadalupe-McCall
(74) *Attorney, Agent, or Firm*—Oliff & Berridge, PLC (57) ABSTRACT

A measurement probe (10) has a stylus part (12) connected to it by means of a ball and cup universal joint (24/25 FIGS. 2 and 3). The stylus part (12) is reorientable relative to the probe and during reorientation is held by means of magnetism or suction to an at tractor (50) whilst the probe (10) is moved. The stylus part (12) is held in static relation to the probe during measurement by means of magnetism or vacuum. The stylus part (12) may be exchanged for another, e.g. 12a or 12b' at rack (100). During exchange the magnetism or vacuum holding (15) the probe and stylus part in static relation is reduced.

15 Claims, 10 Drawing Sheets

STYLUS ORIENTATION

The present invention relates to the orientation of a stylus of a measurement type probe e.g as used on a coordinate positioning machine, brought about by the movement of part of the probe whilst inhibiting movement of the stylus part.

It is common practice to measure a workpiece on a coordinate measurement machine using a probe on a motor driven movable support. The probe produces a signal when touching the surface of a workpiece, this signal is used to record the coordinate position of the stylus. It is often desirable to reorientate a stylus mounted on a measurement probe.

If, for example, it is required to determine the dimensions of a horizontal surface of a workpiece and also a horizontally extending bore in that workpiece, then the-stylus may need to be repositioned. There are a number of ways in which this can be done. Possibly a different stylus can be used for each of the surface and bore inspections, or as is desirable the stylus can be repositioned into a new position. Repositioning can be effected by motors within the probe. Alternatively, repositioning can be effected by restraining some part of the stylus and moving the probe support to reorientate the stylus. A device of this latter type is disclosed in U.S. Pat. No. 5,848,477.

Disclosure of another reorientation technique is made in our U.S. Pat. No. 4,168,576. That document discloses the reorientation of a probe extension arm relative to an articulating probe head by means of driving the arm into abutment with a fixed object. The arm is mounted on a pivotable joint and is forcibly repositioned about the pivot when driven into the fixed object. One pivotable joint disclosed provides friction so that the newly orientated stylus stem says in position. Another joint disclosed latches the stylus into position kinematically, but again has internal friction. Neither of those joints mentioned is readily separable.

Simple devices are disclosed in U.S. Pat. No. 4,523,450 and European Patent No. 0389108. In those documents a stylus ball is pushed into a receptacle to provide calibration of the actual stylus tip position. U.S. Pat. No. 4,523,450 proposes a stylus mounted on a swingable joint which is pushed into a three-faced recess in order to determine its position.

U.S. Pat. No. 5,848,477 also discloses a drive control for moving a stylus tip into a recess and then moving the head whilst the tip hopefully remains centred in the recess.

None of the prior art addresses the problem of maintaining the static relation between parts of the various probes or the problem of stylus exchange.

The present invention provides a probe comprising two relatively re-orientatable parts connectable by a universal joint, one of the parts having a stylus support, the joint comprising two pieces being held in static relation by means of magnetic attraction or a vacuum between the pieces.

Preferably, when the pieces have magnetic attraction the pieces each have respective complementary magnetic or magnetisable elements producing the attractive force between the pieces for holding the pieces in the said static relation.

Preferably, when the pieces have a vacuum therebetween the pieces have a fluid space therebetween and the probe further comprises a part vacuum producer for reducing the fluid pressure in the space, for causing the pieces to be forced together and to be held in the said static relation.

Preferably the two pieces are in the form of a ball and a cup.

Preferably relative vibration takes place between the pieces during relative re-orientation of the parts, and the vibration is caused by varying the magnetic attractive force or the fluid pressure in the space.

Preferably a fluid film is caused to be present between the pieces during re-orientation of the parts.

Preferably the pieces are separable in use.

Preferably during separation of the pieces the magnetic attracting force is reduced, or the pressure in the space is increased.

Preferably the probe further comprises an attractor for holding pivotably the stylus supporting part whilst reorientation of the two parts takes place.

Preferably, during the relative re-orientation, the stylus supporting part is held pivotably by the attractor and the other of the said two parts is moved.

Preferably the attractor holds the stylus supporting part pivotably with the aid of a vacuum and/or magnetism.

Preferably the stylus supporting part comprises a stylus tip distal from one of the pieces and the stylus supporting part is held by the attractor between the stylus tip and the said one of the pieces.

Preferably the stylus is held closer to the said one of the pieces than the stylus tip.

Preferably the ball is provided at the stylus supporting part and the cup is provided at the other of the parts.

Preferably the relative re-orientation between the two parts comprises movement of any point on the stylus supporting part in a part-spherical plane about an approximate centre of the ball, which movement is hemispherical or of greater magnitude than hemispherical.

The invention provides also a stylus positioning device for use with a probe having a stylus, in order to reposition the said stylus, the device comprising a magnetic or vacuum attractor for pivotably holding said stylus during movement of the probe.

In all prior art disclosures the joint used has inherent friction which may cause bending moments in the stylus stem when driving the probe head. Stylus bending results in movement of the probe body support which cannot be accurately related to the position of the stylus tip.

The invention may provide a measurement probe mountable to a coordinate measurement machine, the probe comprising a stylus holder connected to a probe body via a universal joint, the joint comprising two parts being relatively movable, and the parts having bearing surfaces separable by a fluid film.

The fluid film may reduce friction between the parts.

The invention may further provide a measurement probe mountable to a coordinate measurement machine, the probe comprising a stylus holder connected to a probe body via a universal joint, the joint comprising the two parts being relatively movable and the parts being relatively vibratable during relative movement.

The vibrating parts thus have reduced friction during the relative movement.

Preferably the parts have a fluid space therebetween and vibration is brought about by varying the pressure in the space.

Alternatively the parts have complementary magnetic or magnetisable elements for causing the vibration.

The invention may further provide a measurement probe mountable to a coordinate measurement machine, the probe comprising a stylus holder connected to a probe body via a universal joint, the joint comprising a body part and a stylus holder part, the two parts being relatively movable and the stylus holder part including a stylus, and when restrained the holder allowing movement of the stylus part about a fixed point located between the joint and the stylus.

The fixed point may be closer to the joint than the stylus tip, thus reducing the bending moment on the stylus and holder.

U.S. Pat. Nos. 4,523,450 and 5,848,477 are restricted to use with spherical stylus tips. Additionally U.S. Pat. No. 5,848,477 illustrates a configuration which seems to require more than one operation to attain a large angular reorientation. For example to move the stylus through 90° say, might require the stylus tip to be moved into a recess, the head to be driven, the stylus tip to be moved into another recess and the head to be driven once more. U.S. Pat. No. 5,848,477 shows a device which does not seem to be capable of angular movement much beyond 45° to the vertical.

The invention may further provide a measurement probe mountable to a coordinate measurement machine, the probe comprising a stylus holder connected to a probe body via a universal joint, the joint comprising a body part and a stylus holder part, the two parts being relatively movable, the head part being concave and the stylus holder part being convex such that a point on the stylus holder part can move within a hemispherical volume.

The joint is thus designed to allow a large swing, giving at least a 180° arc (i.e. hemispherical movement of the stylus holder or better).

The invention will now be described with reference to the accompanying drawings, wherein.

Figure 1:
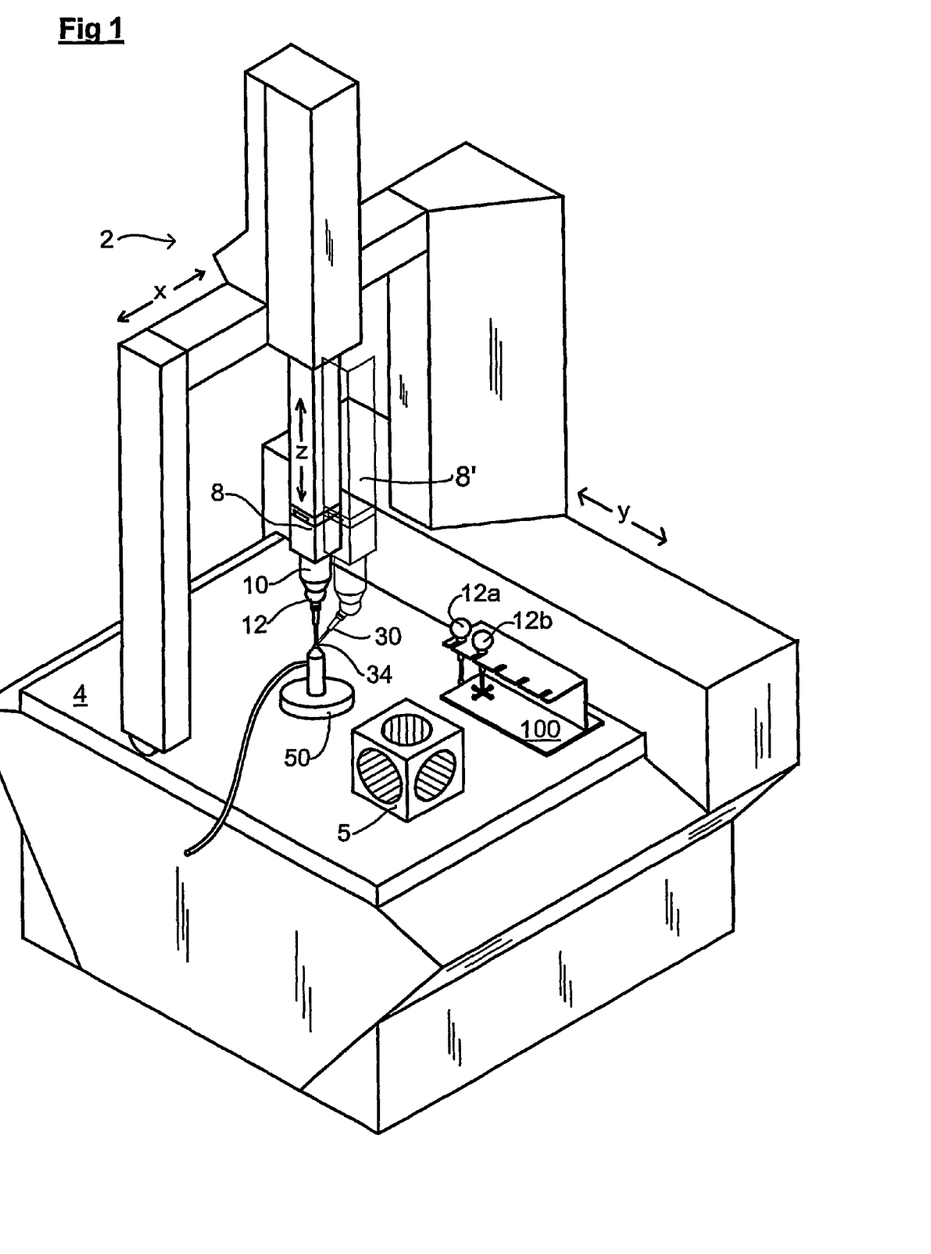
FIG. 1 shows a coordinate measurement machine incorporating embodiments of the present invention.

FIG. 1 shows a typical coordinate measurement machine 2 capable of moving a probe 10 in X,Y and Z axes. Typically when measuring a workpiece component 5 the probe 10 together with a stylus 30 held in stylus holder 12 is moved towards the surface of the workpiece until a stylus tip 34 touches the workpiece. At that instant the probe 10 produces a signal to stop the movement of the probe and to record the-coordinate position of the stylus tip. From this information dimensions of the workpiece can be determined. Desirably all dimensions of the features of the workpiece need to be determined in one operation without moving the workpiece. This can be achieved as described above, either by using different styli, or reorientating the stylus.

Embodiments of this invention concern the reorientation of the stylus by holding a stylus part whilst moving the probe support 8 using the motors of the coordinate measurement machine. In FIG. 1 the probe support is illustrated in a second position 8'. Stylus tip 34 is held in a stylus tip attractor 50 whilst the support is moved from 8 to 8'. This movement will involve adjustments to the probe support in two or possibly three axes. Further reorientation of the stylus holder 12 will, in the example illustrated in FIG. 1, enable the dimensions of the three bores in the workpiece 5 to be inspected.

Figure 2:
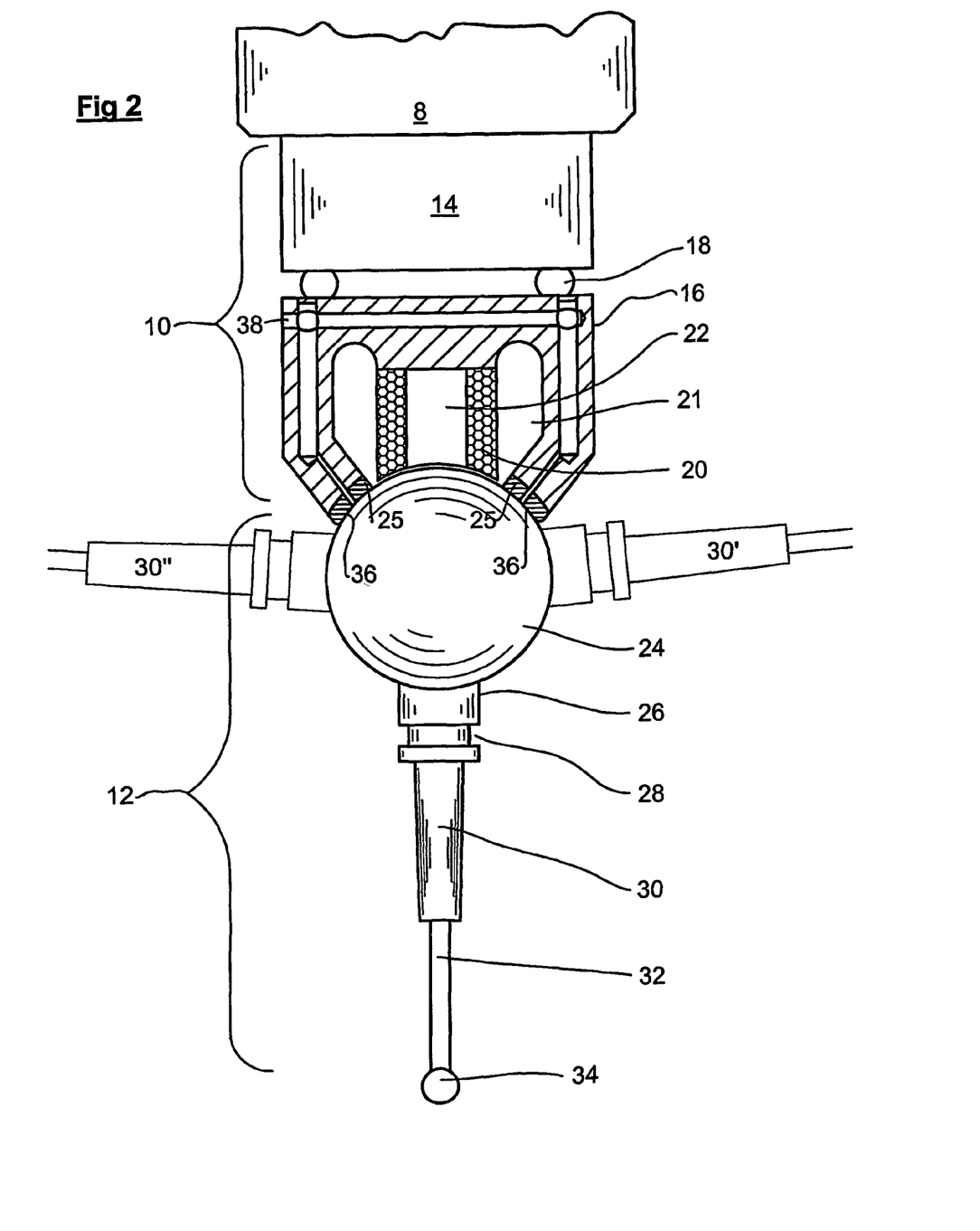
FIG. 2 shows a probe assembly according to one embodiment of the invention.

One embodiment of the measurement probe according to the invention is illustrated in more detail in FIG. 2. The Figure shows a probe 10, which has a probe head 14 and a probe body 12 and which produces a signal to stop the coordinate measurement machine when stylus tip 34 touches a surface. Also shown is a movable stylus holder part 12 which may swing in any direction by virtue of a universal joint formed between cup-shaped bearing surfaces 25 and ball 24. The stylus holder 12 is normally held in place but is free, when released, to swing in a part-spherical manner to bring the stylus into positions within the limits shown by the feint outlines 30' and 30" (i.e. greater than hemispherical movement). Optionally the probe assembly includes a kinematic joint 18 connecting the probe body 16 and probe head 14.

Figure 4:
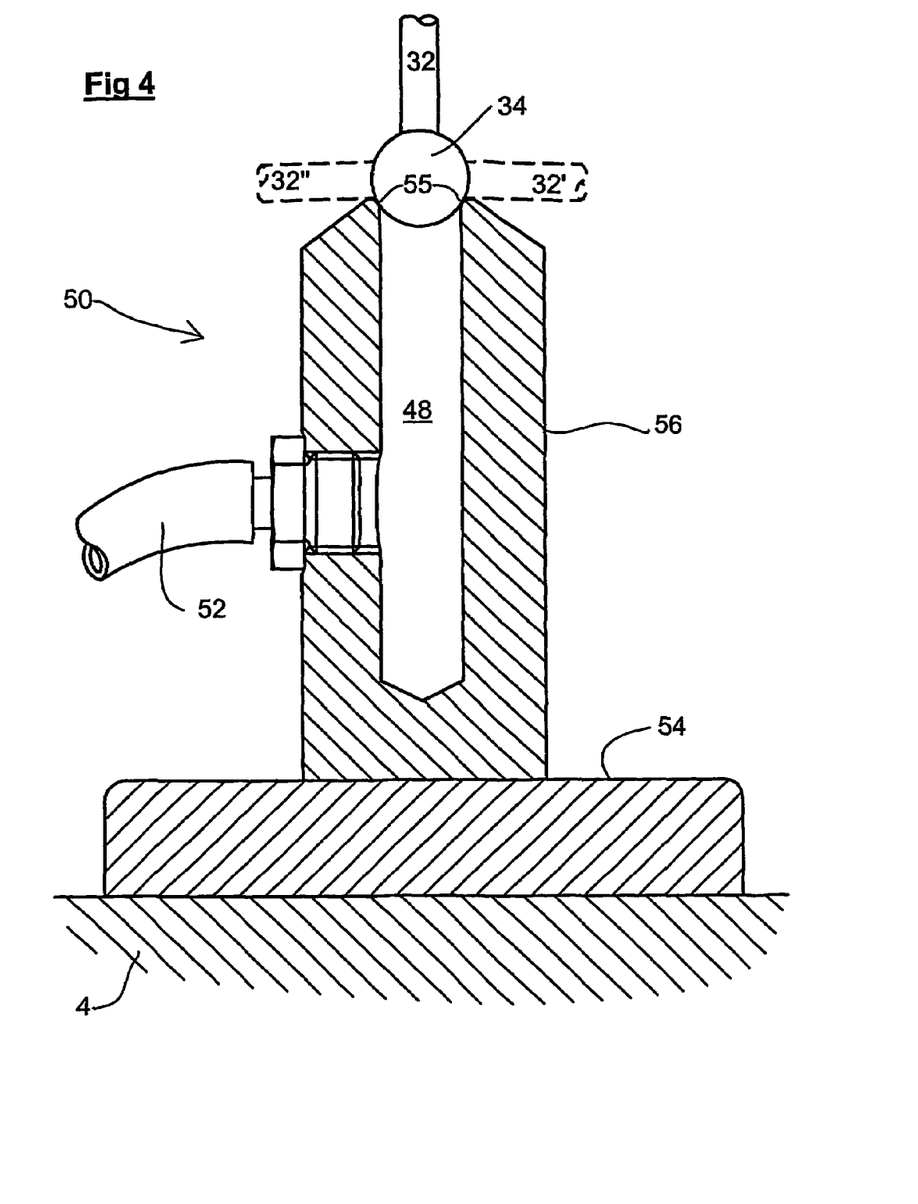
FIG. 4 shows a stylus attractor for a stylus holder, according to a further aspect of the invention.

During reorientation the probe support 8 will be moved such that stylus tip 34 engages the stylus tip attractor 50 (FIGS. 1 & 4). With the stylus tip held centrally in a recess in the attractor 50 the coordinate measurement machine is caused to move probe support 8 in an arc having a centre which coincides with the centre of the stylus tip 34.

During measurement ball 24 is held statically in place in contact with bearing surfaces 25 by the attractive force of a magnet 22. An electromagnet 20 is shown also which may provide additional attraction to hold the ball 24 in place. The ball 24 may be made of ferrous material, or a hollow ceramic body filled with ferrous fluent material. Bearing surfaces 25 may be three pads of ceramic material.

As the support 8 is moved, to reduce friction at the universal joint, and thereby to avoid bending moments in the stylus stem 32 or stylus support stem 30, the magnetic attraction between ball 24 and magnet 22 may be reduced by inducing an opposite field in electromagnet 20. Optionally the electromagnet may be pulsed or the current may be alternated to provide vibrations between the probe body 16 and the ball 24. These vibrations will reduce the friction in the universal joint. An optional air supply 38 is shown for feeding jets 36. These air jets 36 provide a low friction universal joint, when operated. Where an air supply is provided on the machine this may be used to supply pressurised air via conduits 38 to air jets 36 whilst movement of the universal joint takes place. This air supply will cause a fluid film to form between the surface of the ball 24 and the bearing surfaces 25 and will thereby reduce the friction between the two. The fluid film may replace or augment the electromagnetic friction reducing effects mentioned above.

When movement to the correct orientation has taken place the current in the electromagnet 20 may be switched off or reversed, and/or the air supply discontinued. The stylus holder 12 will thus be repositioned and ready for use.

Figure 3:
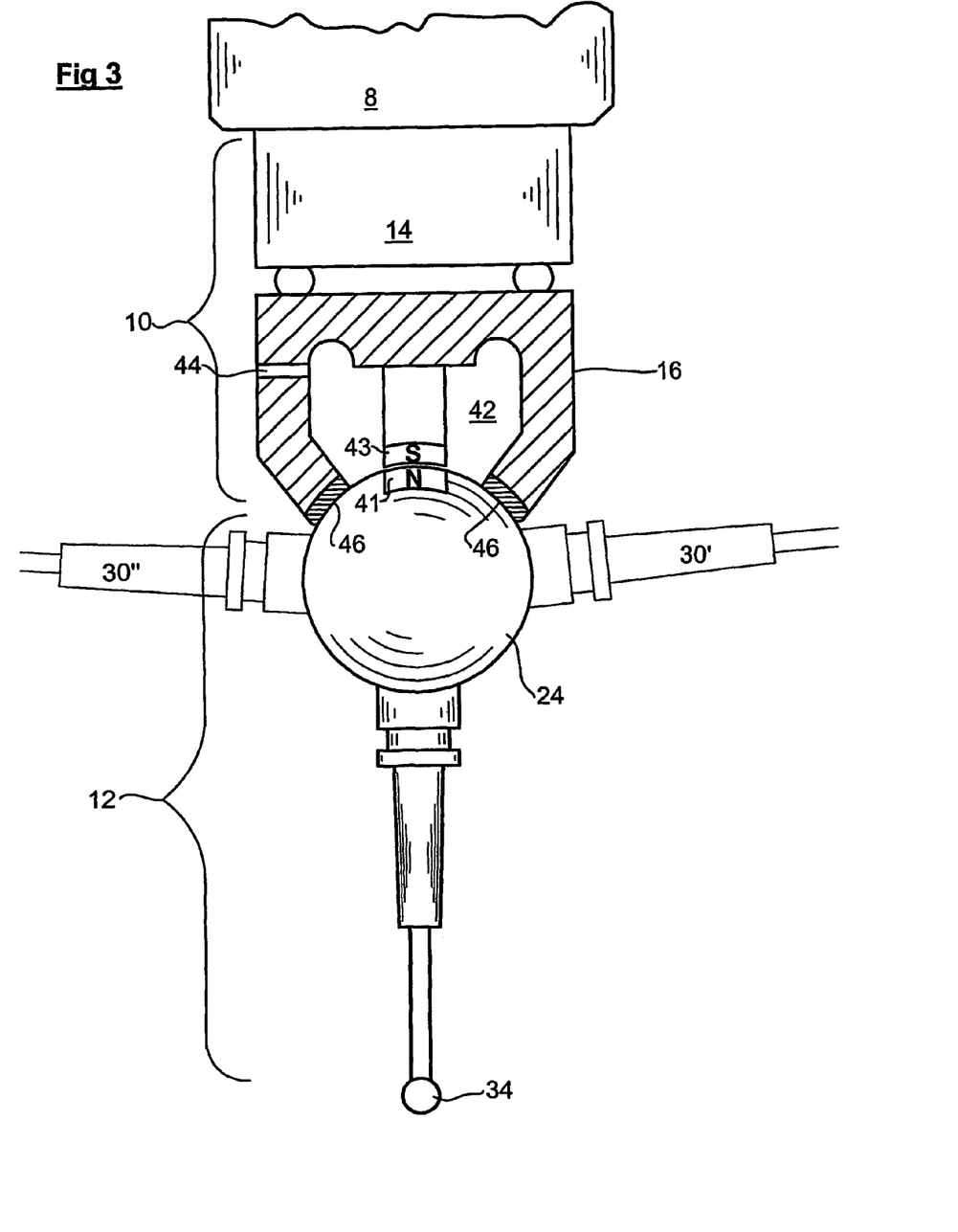
FIG. 3 shows a probe assembly according to a further embodiment of the invention.

FIG. 3 shows a similar probe assembly to that shown in FIG. 2. In this embodiment electromagnet 20 and magnet 22 are replaced by a vacuum chamber 42. Vacuum is induced via a conduit 44. In this embodiment a part-spherical bearing surface 46 is provided.

During measurement a vacuum is held in the chamber 42, to hold the stylus holder 12 in place, in static relation to the probe body 16.

When reorientation of the stylus holder 12 is required the pressure within the chamber 42 is increased so as to reduce the holding force on the ball 24. Once reorientation has taken place the pressure in the chamber 42 is reduced once more. Optionally (not shown) an electromagnet and/or air bearings may be used to reduce friction, as described above. Ball 24 need not be of a magnetic/magnetisable material if a vacuum is used solely.

FIG. 4 shows a stylus attractor 50 for holding a stylus tip 34 whilst movement of the probe support 8 takes place. The attractor comprises a conduit 48 within a body 56. At one end of the conduit is a lip 55 which forms a datum surface for holding the stylus tip 34. Within the conduit 48 there is induced a vacuum which is provided by a vacuum tube 52. The body 56 is mounted to a base 54 which can be fixed to the bed 4 of the coordinate measurement machine 2.

During reorientation, the stylus tip 34 is moved into contact with the lip 55 and a vacuum is generated within the conduit 48. This vacuum holds the stylus tip 34 against the lip 55 whilst the stylus holder 12 is reorientated. It will be noted that the stylus stem 32, together with the stylus holder 12 can be repositioned anywhere within the limits shown by the chain-dotted lines 32' and 32". The friction at the universal joint is reduced as reorientation takes place, and increased again when reorientation is complete.

Figures 5A, 5B:
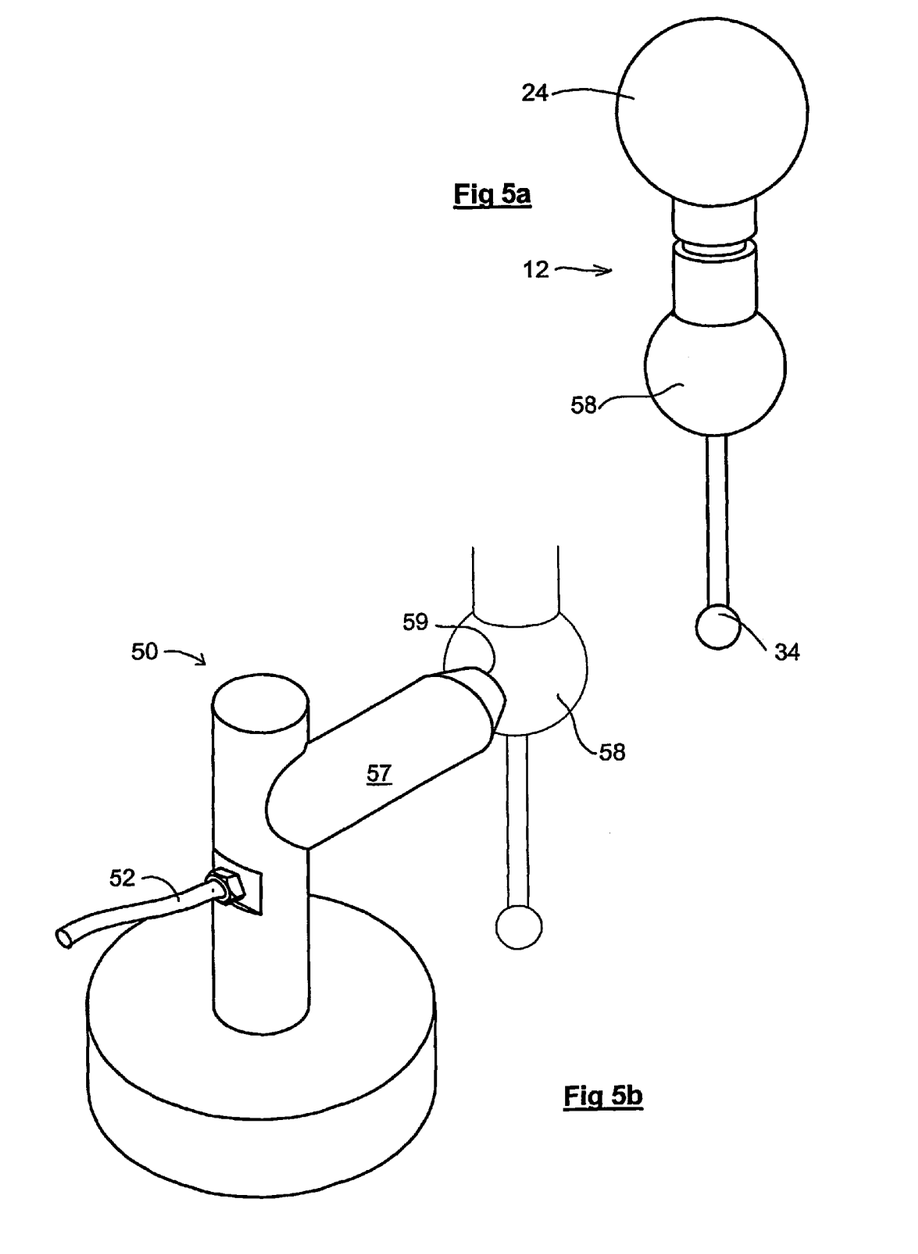
FIG. 5a shows a stylus holder according to a further embodiment of the invention.
FIG. 5b shows a variant of the stylus attractor shown in FIG. 4.

FIGS. 5*a* and 5*b* show a modified form of stylus holder 12 and attractor 50. In FIG. 5*a* the stylus holder 12 is provided with a second ball 58 and it is this ball 58 which is held whilst reorientation takes place rather than holding the stylus tip 34. As shown in FIG. 5*b*, attractor 50 is used to hold the ball 58, again using a vacuum supplied by tube 52. In this instance a horizontal body 57 is used and a datum lip 59 is provided which will be of a larger diameter than the datum lip 55 shown in FIG. 4. The technique for reorientation of the stylus holder is the same as that described above.

In FIGS. 4 and 5*b* the vacuum attraction may be replaced or augmented by magnetic attraction.

Figures 6A, 6B:
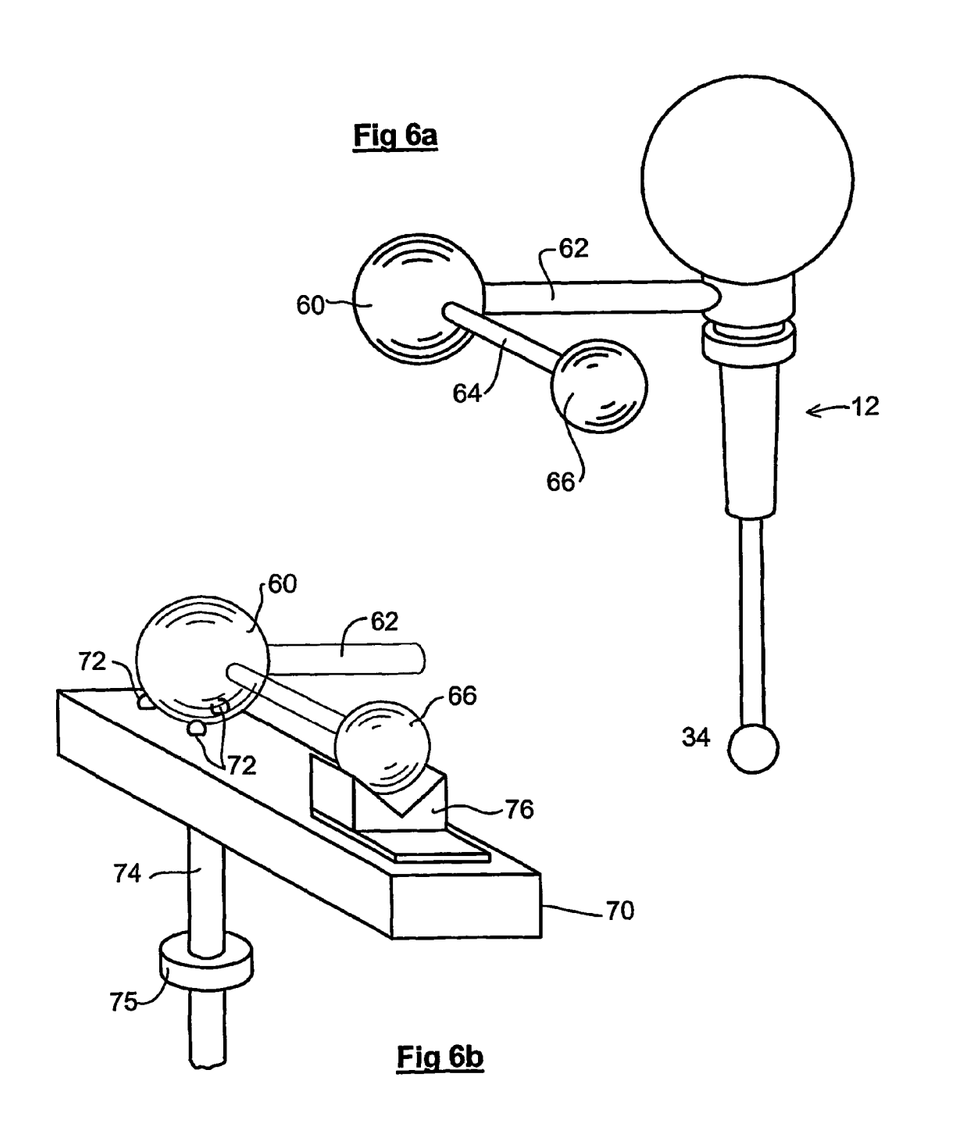
FIG. 6a shows another stylus holder according to another embodiment of the invention.
FIG. 6b shows another attractor for the stylus holder shown in FIG. 6.

Yet another configuration for reorientating the stylus holder 12 is shown in FIGS. 6*a* and 6*b*. Here two balls 60 and 66 are provided on arms 62 and 64 respectively. These balls are moved toward a datum device 70 shown in FIG. 6*b*. Ball 60 is brought into contact with three datum balls 72 and held there magnetically whilst at the same time ball 66 is brought into contact with a vee-shaped magnetic pad 76. The datum device 70 is fixed to a stem 74 which may be connected to the machine bed 4 via a friction bearing 75 which allows the datum device 70 to rotate so as to allow proper seating of the balls 60 and 66. In use, the stylus holder 12 can be moved in a plane which is perpendicular to the axis AA which runs between the centres of the two balls 60 and 66. Although the movement of the stylus 34 in FIG. 6*a* will be restricted, this planar movement may be useful e.g. for inspection of features lying in the same plane.

Figures 7, 8:
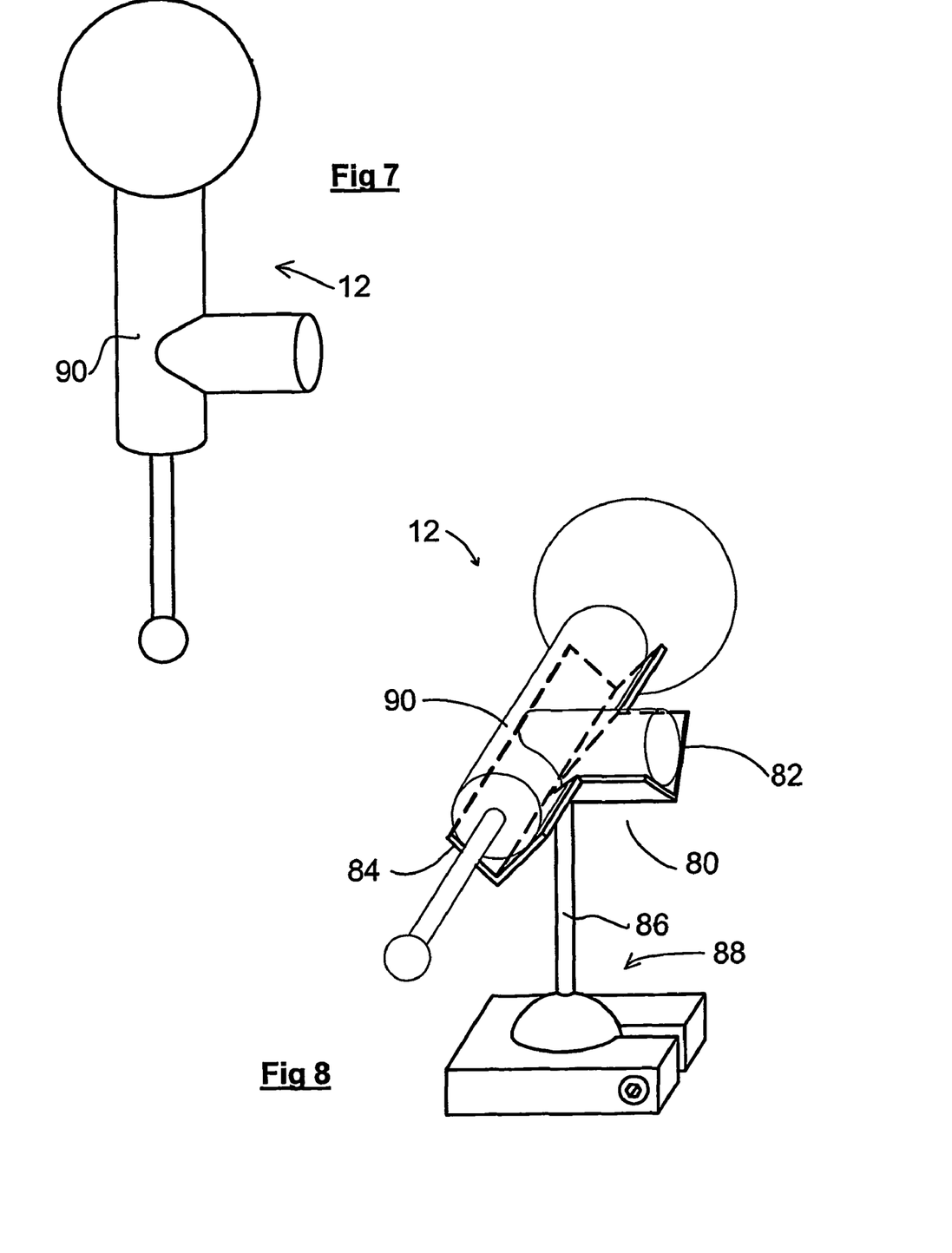
FIG. 7 shows a stylus holder according to a further embodiment.
FIG. 8 shows a stylus holder support for supporting the stylus holder shown in FIG. 7.
Figure 9:
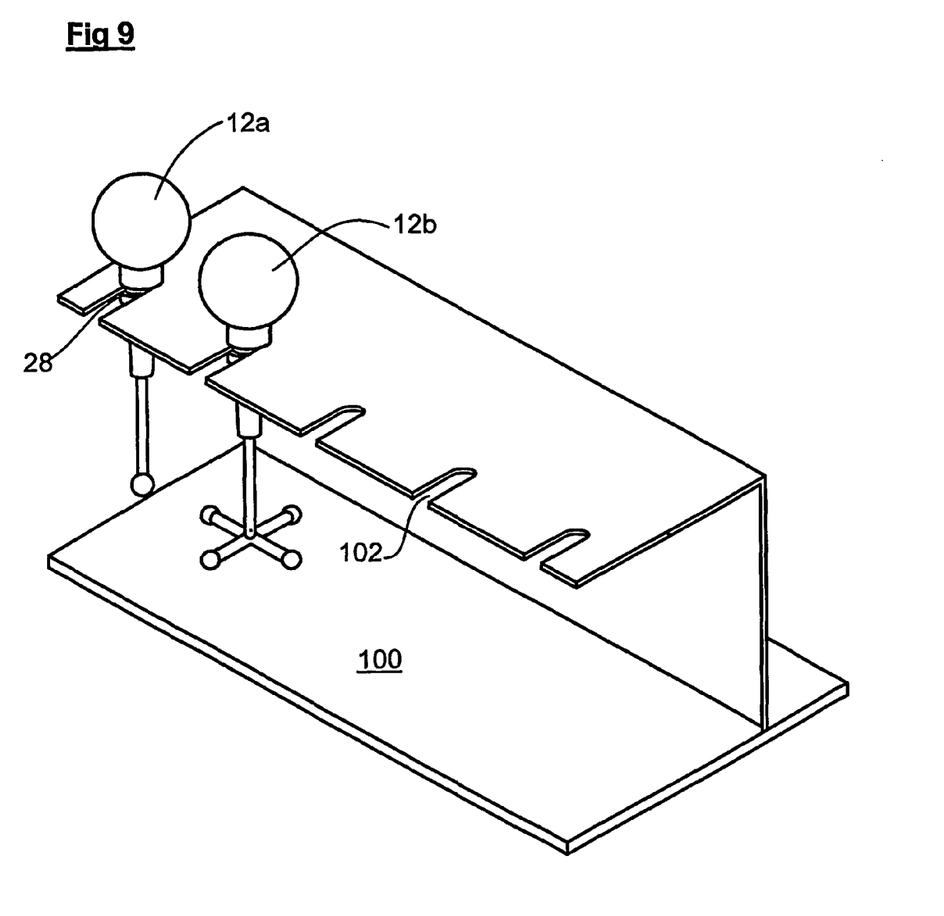
FIG. 9 shows another stylus holder support for holding multiple stylus holders.

Although reorientation of the stylus holder 12 will provide flexibility when dimensions of various features need to be measured, it may be desirable to change the stylus tip for different operations. Using a ball 24 held in a concavity, allows the stylus holder to be exchanged. FIG. 7 shows one configuration of stylus holder 12 which may be exchangeable. FIG. 7 shows a stylus holder portion 90 which, making reference to FIG. 8, is supportable in a stylus support 80. Stylus support 80 includes two arms 82 and 84 for holding the stylus portion 90 in a fixed position. Also the holder 80 includes a stem 86 for supporting the holder and an adjustable ball joint 88 for positioning the holder in the desired position. The ball joint 88 has a fixed portion which may be clamped to the machine bed 4. Another holder 100 is shown in FIG. 9. This holder has slots 102 which hold one or more stylus holders 12 by utilising groove 28 in the stylus holder stem 26.

It is envisaged that the probe support 8 will be driven to the holder 80/100 and then moved away leaving a stylus holder 12 in the holder (or picking one up). Thus automatic stylus changing is possible. Holders 80 and 100 have the advantage that when the stylus holder 12 is picked up then its orientation is known.

Release of the stylus holder 12 into holder 80 or 100 is effected by causing a weakening of magnet 22 by reversing the polarity of electromagnet 20 and/or by increasing the pressure in chamber 42. These actions will allow the stylus holder to fall or be pulled from the probe body 16. Pick-up of the stylus holder is a reverse action, i.e. increasing the attraction of magnet 22 and/or reducing the pressure in chamber 42.

At any time during an inspection operation the stylus holder can be repositioned, for example after being knocked accidentally out of place, by reducing the friction between the ball 24 and bearing surfaces 40 or 46. Reducing the friction sufficiently will allow the stylus holder 12 to hang down vertically or at a known angle. The stylus holder can then be reorientated to an exact position for example using the attractor 50.

Complementary magnetic elements in the stylus holder 12 and probe body 16 respectively may be provided to pull the stylus holder into a known approximate position (e.g. should it be accidentally knocked out of place). Thus by effecting a friction reducing increase in pressure in the chamber 42 shown in FIG. 3, the stylus holder may be pulled to its downward position shown to give an approximate position ready for reorientation, by means of opposed magnetic elements 41 and 43.

Figure 10:
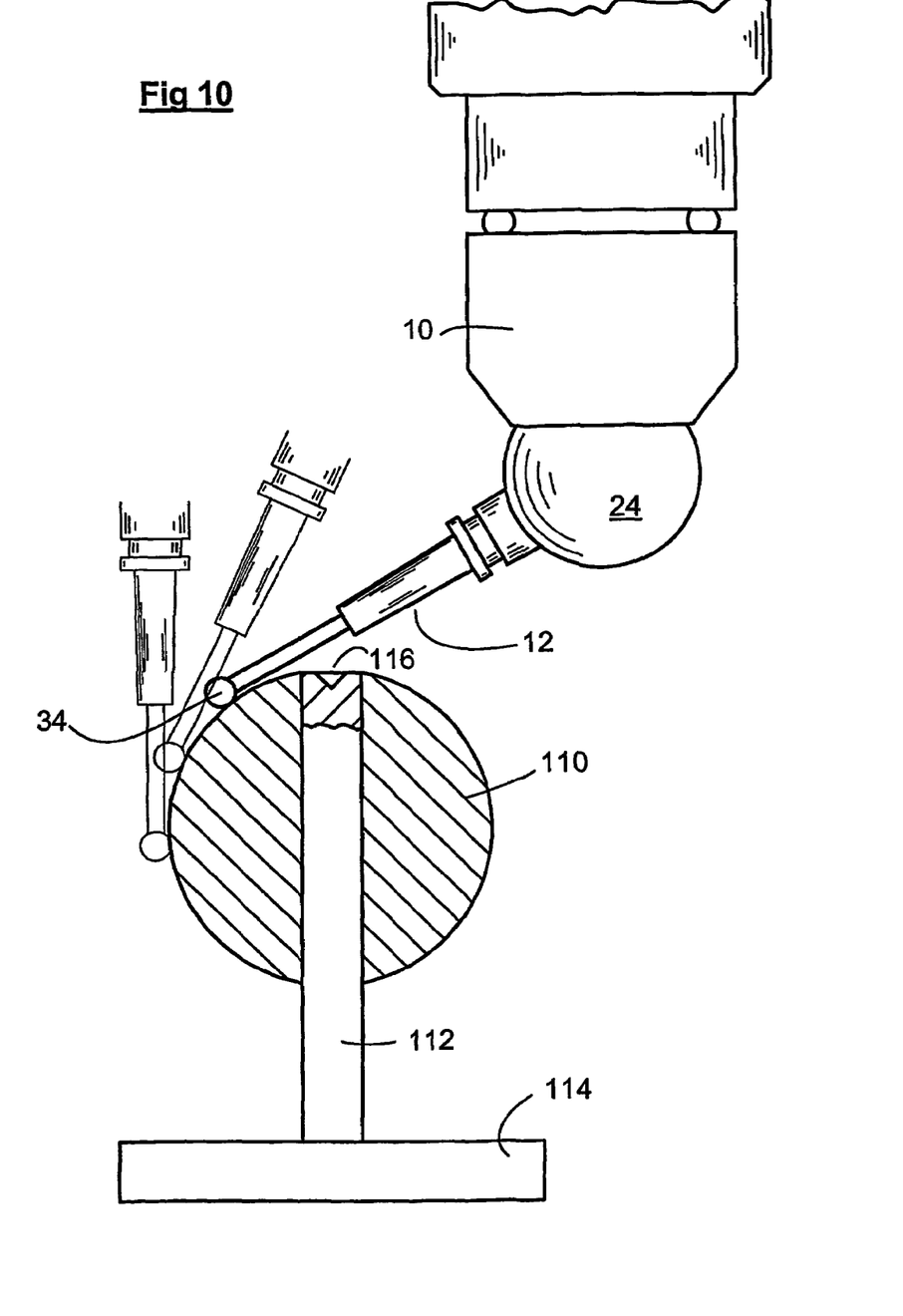
FIG. 10 shows apparatus for repositioning the stylus holder shown in FIG. 6.

FIG. 10 shows further apparatus for re-orienting the stylus holder 12 relative to the probe 10 whilst the probe is moved. In this embodiment the stylus tip 34 is brought up against a resilient ball 110 e.g made of rubber. The ball has a solid central pin 112 secured to a base 114. The universal joint between the holder and the probe is vibrated as discussed above and the ball 24 is allowed to pivot as the probe is moved so that the stylus holder 12 is repositioned as desired.

The exact position of the stylus tip 34 can be determined if the tip is sunk into a cone 116 or similar location point, mounted in this case at the top of the pin 112. This finding of the stylus tip's exact position is know as "datuming".

Figure 11:
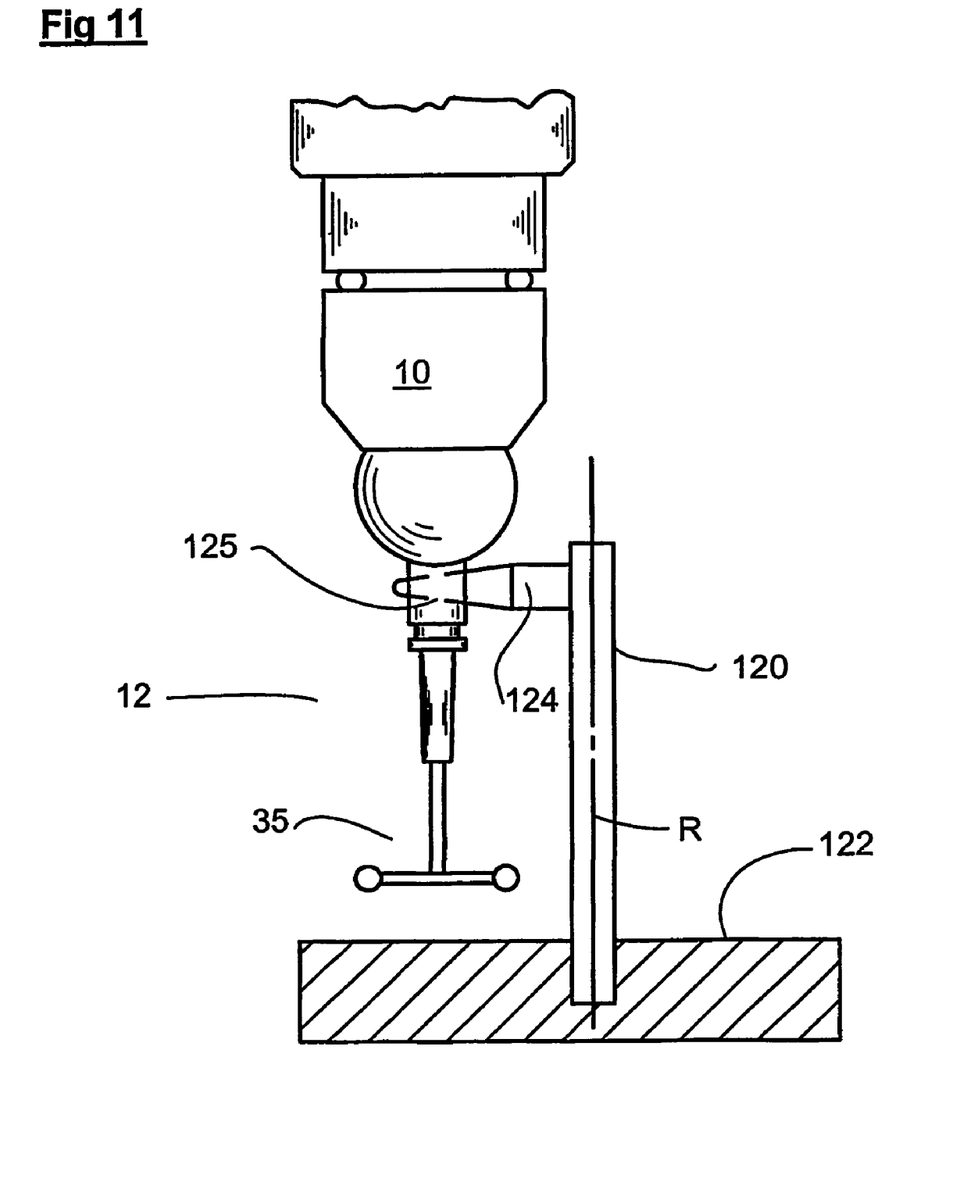
FIG. 11 shows further apparatus for repositioning a stylus holder.

FIG. 11 shows an embodiment suitable for finding and reorientating in one axis a "star" type stylus tip 35. This type of tip is problematic for the re-orientation devices shown in FIGS. 4 and 5*b* because is it difficult to ascertain the position of the various tips of the "star" about the axis of the stem of the stylus. In this embodiment a support 120 is rotatable in a base 122 about axis R. Tapered peg 124 affixed to the support is locatable into a complementary hole 125 in the stem in stylus holder 12. Mating of the peg with the hole is performed by allowing the stylus holder 12 to drop into a vertical position if necessary and moving the stylus holder toward the peg. The approximate position of the peg relative to the hole will be known so the hole and peg can brought together. By moving the probe 10 about axis R the position of the star stylus 35 about its own axis can be altered as desired.

The description and drawings show a probe 10 with a stylus holder 12 attachable to the probe. This configuration is merely illustrative of one way of carrying out the invention. Other configurations are possible, for example it is possible that a head has a universal joint attached thereto and the probe and stylus are mounted to be re-orientateable relative to the head i.e. the probe mechanism is below the universal joint.

The description and claims refer to a vacuum. Herein this word encompasses any fluid pressure which is lower than ambient or a complete vacuum.

The description and drawings show a ball and cup type universal joint. However, the invention is not so limited. Any universal joint having a convexity and an element be to received around the convexity, or a concavity and an element to be received into the concavity will suffice. E.g. a large ball (the convexity) nestable within three smaller spaced balls, or a cup (a concavity) as one piece of the joint and three balls in fixed relation to be received into the cup.

The invention claimed is:

1. A probe comprising two parts, including a separable joint connecting the two parts allowing removal of the two parts from each other and relative re-orientation of the two parts about two rotational axes, one of the two parts having a stylus support, and being separable from the other of the two parts, the two parts being holdable in any of a plurality of positions about the two axes in static relation, when re-oriented, by magnetic attraction and/or a vacuum between the two parts, the two parts being in the form of a ball and a cup with the magnetic attraction and/or vacuum therebetween, allowing the joint to be separable for re-orientation.

2. A probe as claimed in claim 1 wherein, when the parts have magnetic attraction, the parts each have respective complementary magnetic or magnetisable elements producing the magnetic attraction between the parts for holding the pieces in the static relation.

3. A probe as claimed in claim 1 wherein, when the parts have a vacuum therebetween, the parts have a fluid space therebetween and the probe further comprises a vacuum producer for reducing fluid pressure in the fluid space, for causing the parts to be forced together and to be held in the static relation.

4. A probe as claimed in claim 1 wherein relative vibration takes place between the parts during relative re-orientation of the parts, and the vibration is caused by varying a force of the magnetic attraction and/or the vacuum.

5. A probe as claimed in claim 1 wherein a fluid film is caused to be present between the parts during re-orientation of the parts.

6. A probe as claimed in claim 1 wherein during separation of the parts a force of the magnetic attraction and/or the vacuum is reduced.

7. A probe as claimed in claim 1 wherein the probe further comprises an attractor for holding pivotably the stylus supporting part whilst reorientation of the two parts takes place.

8. A probe as claimed in claim 7 wherein, during the relative re-orientation, the stylus supporting part is held pivotably by the attractor and the other of the two parts is moved.

9. A probe as claimed in claim 8 wherein the attractor holds the stylus supporting part pivotably with the aid of a vacuum and/or magnetism.

10. A probe as claimed in claim 7 wherein the stylus supporting part comprises a stylus tip distal from the joint and the stylus supporting part is held by the attractor between the stylus tip and the universal joint.

11. A probe as claimed in claim 10 wherein the stylus is held closer to the joint than the stylus tip.

12. A probe as claimed in claim 1 wherein the ball is provided at the stylus supporting part and the cup is provided at the other of the parts.

13. A probe as claimed in claim 1 wherein the relative re-orientation between the two parts comprises movement of any point on the stylus supporting part in a part-spherical plane about an approximate centre of the ball, which movement is hemispherical or of greater magnitude than hemispherical.

14. A probe as claimed in claim 1, wherein the joint is in a form of a ball, a position of a gravity center of the joint remaining unchanged relative to any of the two parts when the two parts are being re-oriented.

15. A stylus positioning device for use with a probe having a stylus, the stylus having a free end that is released from the attractor, after being repositioned by the attractor, for making measurements of an object, the device comprising a magnetic and/or vacuum attractor for pivotably holding said stylus during movement of the probe.

* * * * *